F. M. NOLDER.
ANIMAL TRAP.
APPLICATION FILED APR. 8, 1913.

1,078,457.

Patented Nov. 11, 1913.

Witnesses
W. S. McDowell
V. B. Hillyard

Inventor
Francis M. Nolder,
By Victor J. Evans
Attorney

UNITED STATES PATENT OFFICE.

FRANCIS M. NOLDER, OF WESTBORO, OHIO.

ANIMAL-TRAP.

1,078,457.

Specification of Letters Patent.    Patented Nov. 11, 1913.

Application filed April 8, 1913.   Serial No. 759,736.

*To all whom it may concern:*

Be it known that I, FRANCIS M. NOLDER, a citizen of the United States, residing at Westboro, in the county of Clinton and State of Ohio, have invented new and useful Improvements in Animal-Traps, of which the following is a specification.

The invention provides a trap designed particularly for exterminating rodents and small animals, such as infest dwellings and places of human abode and has for its object to provide a trap which will not only catch the animal, but which will at the same time kill, thereby precluding the possibility of the animal escaping when once ensnared.

The invention provides a trap of the type having a spring actuated jaw of substantially U form and a breaker rim arranged to coöperate with such jaw, the two coöperating to extinguish the life of the animal and preclude any possibility of escape.

The invention consists of the novel features, details of construction and combination of parts, which hereinafter will be more particularly set forth, illustrated in the accompanying drawing, and pointed out in the appended claims.

Figure 1:
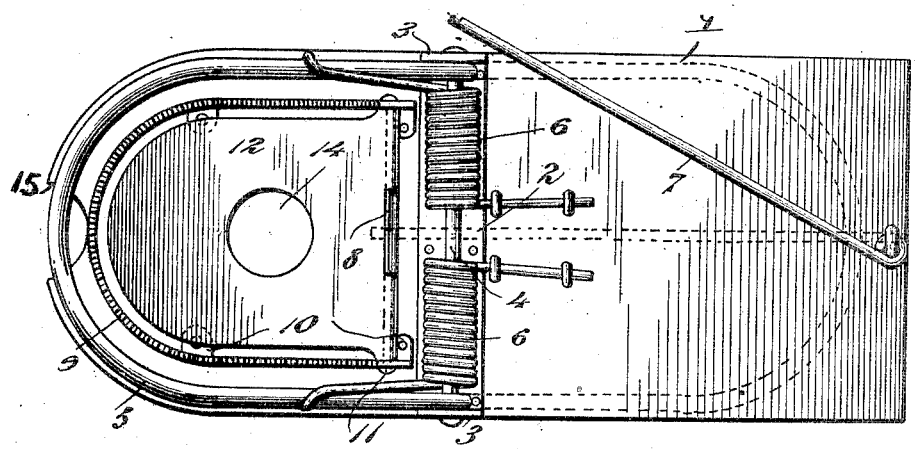
Figure 2:
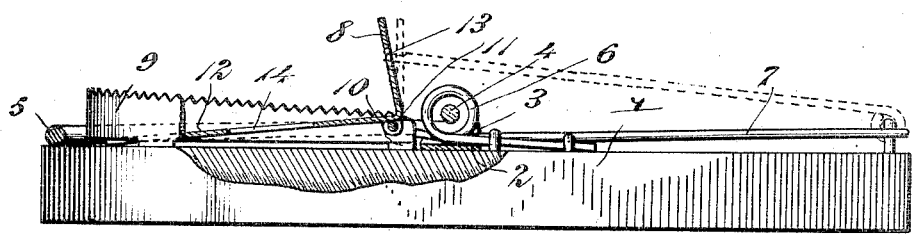
Figure 3:
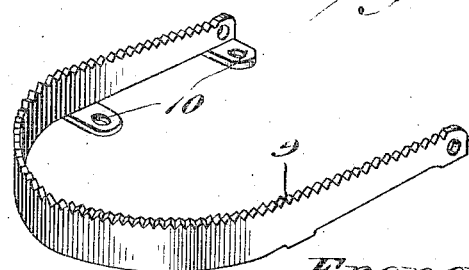

Referring to the drawing, forming a part of the specification, Figure 1 is a top plan view of a trap embodying the invention, the full lines showing the position of the parts before the trap is set and the dotted lines indicating the position of the parts when the trap is set. Fig. 2 is an edge view, parts broken away, the full and dotted lines showing the relation of the parts in the positions indicated by the full and dotted lines in Fig. 1. Fig. 3 is a detail view of the breaker rim.

Corresponding and like parts are referred to in the following description, and indicated in all the views of the drawing, by the same reference characters.

The trap comprises a base 1, which is preferably of wood. A plate 2 is secured to the base by suitable fastenings and has upstanding ears 3 which are apertured to receive a rod 4 upon which the jaw and its operating springs are mounted. The jaw 5 is of substantially U form and is provided at its extremities with eyes through which the rod 4 passes. Helical springs 6 are mounted upon the rod 4 and are provided at their ends with extensions which engage the base and jaw so as to hold the latter normally in contact with the base. When the trap is set the jaw 5 is turned upon the rod 4 against the tension of the spring 6, said jaw being held in operative position by means of a locking lever 7 and a catch 8 which forms part of a trigger. A notch 15 is formed in the rounded end of the base 1 to facilitate entrance of the tip of the finger beneath the jaw 5 when setting the trap. A breaker-rim 9 is secured to an end portion of the base 1 in such a position as to conform to the shape of the jaw and to be spaced a short distance therefrom. The upper edge of the breaker-rim is preferably toothed, thereby preventing any possible escape of the animal in its final struggles. The breaker-rim 9 preferably consists of a strip of metal bent into U form and having ears 10 which are apertured to receive fastenings by means of which the breaker-rim is attached to the base 1. A rod 11 is supported in the end portions of the breaker rim and forms a support for the trigger, which is arranged to operate within the space inclosed by the breaker-rim.

The trigger comprises a platform 12 and a catch 8, said parts being preferably formed of a sheet metal blank cut into the form substantially as shown and having the part 8 bent approximately at a right angle to the part 12. An opening 13 is formed in the catch or upwardly extending part 8 of the trigger and receives the extremities of the locking lever 7 when the trap is set. The platform 12 has an opening 14 intended to receive the bait, said platform being spaced from the base when the trap is set so that any pressure upon the platform will cause a movement of the catch and thereby release the locking lever when the jaw will be quickly thrown by the action of the springs 6 so as to catch the animal and break its neck over the part 9, thereby killing the same quickly.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. An animal trap comprising a base, a spring actuated jaw of substantially U form mounted upon the base, means for holding the jaw set against the tension of its operating spring and including a locking lever, a platform and catch, a breaker rim comprising a strip bent into substantially U form and having apertured lugs and having its end portions apertured, said breaker rim being arranged upon the base intermediate of the jaw and platform, means for securing the breaker rim to the platform through the instrumentality of the apertured lugs, and other means for pivotally connecting the trigger to the rear ends of the breaker rim.

2. An animal trap comprising a base, a plate secured to the base and having upstanding apertured ears, a U shaped jaw, a rod pivotally connecting the jaw to the upstanding ears of the plate, a helical spring mounted upon the rod and engaging the jaw and base, a U shaped breaker rim having its upper edge toothed and secured to the base, a trigger comprising a platform and upstanding catch arranged within the breaker rim and pivoted thereto, and a locking lever pivotally connected to the base and adapted to extend over the jaw when the trap is set and engage the catch to hold the jaw against the tension of the spring arranged to co-operate therewith.

In testimony whereof I affix my signature in presence of two witnesses.

FRANCIS M. NOLDER.

Witnesses:
A. D. MOORHEAD,
J. S. LAYMON.

---

Copies of this patent may be obtained for five cents each, by addressing the "Commissioner of Patents, Washington, D. C."